United States Patent
George et al.

(10) Patent No.: US 10,670,413 B2
(45) Date of Patent: Jun. 2, 2020

(54) TRAVEL PLANNING BASED ON MINIMIZING IMPACT OF VEHICULAR EMISSION

(71) Applicant: International Business Machines Corporation, Armonk, NY (US)

(72) Inventors: Thomas George, Bangalore (IN); Rashmi Mittal, Noida (IN); Chandrasekar Radhakrishnan, New Delhi (IN); Yogish Sabharwal, New Delhi (IN); Vaibhav Saxena, New Delhi (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 131 days.

(21) Appl. No.: 14/992,806

(22) Filed: Jan. 11, 2016

(65) Prior Publication Data
US 2017/0199045 A1 Jul. 13, 2017

(51) Int. Cl.
G01C 21/34 (2006.01)

(52) U.S. Cl.
CPC ..... *G01C 21/3461* (2013.01); *G01C 21/3469* (2013.01)

(58) Field of Classification Search
CPC .......................... G01C 21/3461; G01C 21/3469
USPC .......................................................... 701/423
See application file for complete search history.

(56) References Cited

U.S. PATENT DOCUMENTS

| 8,255,151 | B2 | 8/2012 | Bourque et al. |
| 8,744,766 | B2 | 6/2014 | Rakshit |
| 2001/0047237 | A1* | 11/2001 | Nakagawa ........... G06Q 10/047 701/533 |
| 2007/0260405 | A1* | 11/2007 | McConnell ............ G06Q 10/06 702/24 |
| 2009/0070024 | A1* | 3/2009 | Burchard ............... G01C 21/26 701/117 |
| 2010/0076675 | A1* | 3/2010 | Barth ................. G01C 21/3469 701/532 |
| 2010/0088016 | A1* | 4/2010 | Aghara ............. G01C 21/3469 701/533 |

(Continued)

FOREIGN PATENT DOCUMENTS

| CN | 103729183 A | 4/2014 |
| WO | WO0208922 A1 | 1/2002 |
| WO | WO2013154901 A1 | 10/2013 |

OTHER PUBLICATIONS

Website, "Vehicle Optimization Solutions", 5 pages, URL: http://spatialpoint.com/vehicle-optimization, Accessed on Jan. 11, 2016.

*Primary Examiner* — Khoi H Tran
*Assistant Examiner* — Rodney P King
(74) *Attorney, Agent, or Firm* — Ference & Associates LLC (57) ABSTRACT

One embodiment provides a method for determining at least one recommended vehicular travel route, the method including collecting a plurality of travel route inputs from a plurality of sources, relative to a travel route comprising a starting point and an ending point; determining at least one travel route recommendation by (i) assessing the collected plurality of travel route inputs and (ii) taking in to consideration vehicle emission impact parameters; and tracking vehicle adherence. Other variants and embodiments are broadly contemplated herein.

19 Claims, 5 Drawing Sheets

(56) References Cited

U.S. PATENT DOCUMENTS

| | | | | |
|---|---|---|---|---|
| 2010/0153001 A1* | 6/2010 | Bauchot | ............ | G01C 21/3461 |
| | | | | 701/533 |
| 2010/0299054 A1* | 11/2010 | Hennequet | ............ | B60W 10/26 |
| | | | | 701/123 |
| 2011/0161116 A1* | 6/2011 | Peak | ............ | G06Q 40/08 |
| | | | | 705/4 |
| 2011/0169663 A1* | 7/2011 | Stahlin | ............ | G08G 1/163 |
| | | | | 340/933 |
| 2011/0218834 A1* | 9/2011 | Boss | ............ | G06Q 10/06316 |
| | | | | 705/7.26 |
| 2013/0339266 A1* | 12/2013 | Looman | ............ | G06Q 10/08355 |
| | | | | 705/338 |
| 2014/0180512 A1* | 6/2014 | Kozloski | ............ | B60W 10/02 |
| | | | | 701/22 |

\* cited by examiner

TRAVEL PLANNING BASED ON MINIMIZING IMPACT OF VEHICULAR EMISSION

BACKGROUND

Air pollution, the contamination of the indoor or outdoor environment by any chemical, physical or biologic agent that modifies the natural characteristics of the atmosphere, has been on a steep rise in numerous cities across the globe. It is one of the primary reasons for deterioration in the quality of urban life and responsible for many deaths and serious health disorders. Pollutants of major public health concern include particulate matter, carbon monoxide, ozone, nitrogen oxide and sulfur dioxide. Motor vehicle emission is a leading cause of air pollution, but difficult to regulate compared to industry emissions, since vehicles move across geographical zones and individual vehicle emissions are not easily estimated. Various government agencies have made (or are considering) attempts to reduce emissions using appropriate incentive mechanisms, for example, tolls or taxes, and/or by publishing area-specific air quality indices to enable environmentally conscious citizens to self-regulate.

BRIEF SUMMARY

In summary, one aspect of the invention provides a method of determining at least one recommended vehicular travel route, said method comprising: utilizing at least one processor to execute computer code that performs the steps of: collecting a plurality of travel route inputs from a plurality of sources, relative to a travel route comprising a starting point and an ending point; determining at least one travel route recommendation by: (i) assessing the collected plurality of travel route inputs and (ii) taking into consideration vehicle emission impact parameters; and tracking vehicle adherence to the at least one travel route recommendation.

Another aspect of the invention provides an apparatus for determining at least one recommended vehicular travel route, said apparatus comprising: at least one processor; and a computer readable storage medium having computer readable program code embodied therewith and executable by the at least one processor, the computer readable program code comprising: computer readable program code configured to collect a plurality of travel route inputs from a plurality of sources, relative to a travel route comprising a starting point and an ending point; computer readable program code configured to determine at least one travel route recommendation by: (i) assessing the collected plurality of travel route inputs and (ii) taking into consideration vehicle emission impact parameters; and computer readable program code configured to track vehicle adherence to at least one travel route recommendation.

An additional aspect provides a computer program product for determining at least one recommended vehicular travel route, said computer program product comprising: at least one processor; and a computer readable storage medium having computer readable program code embodied therewith and executable by the at least one processor, the computer readable program code comprising: computer readable program code configured to collect a plurality of travel route inputs from a plurality of sources, relative to a travel route comprising a starting point and an ending point; computer readable program code configured to determine at least one travel route recommendation by: (i) assessing the collected plurality of travel route inputs and (ii) taking into consideration vehicle emission impact parameters; and computer readable program code configured to track vehicle adherence to the at least one travel route recommendation.

A further aspect of the invention provides a method comprising: recommending a plurality of vehicular travel routes that encompass various time-specific risk zones; measuring ambient air quality in the time-specific risk zones; assessing the effective emission costs of each of the plurality of travel routes; thereupon identifying a preferred route; and tracking vehicle adherence to the preferred travel route.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made here below to FIG. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an exemplary embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

The impact of a fixed amount of emission (or pollutant) varies depending on several factors such as demographics of the area, weather conditions and ambient air quality. By using travel route recommendations that consider multiple emission factors, organizations will have a means of assessing the effects of vehicular emission that can provide an objective, data-driven way of calculating the influence of emissions on the environment. This analysis can greatly enhance the air quality of the environment, as well as greatly impact overall human health.

Broadly contemplated herein, in accordance with at least one embodiment of the invention, are methods and arrangements which provide determining a recommended vehicular travel route and tracking the route taken. A driver will utilize a system to recommend travel routes based on effective vehicular emission (also known as a recommender) given a current or future travel plan to acquire recommended travel routes with minimum effective emission. The effective emission by way of example, describes the core idea of capturing the weather, air and demographic conditions in small, segmented regions or zones. All of these variables are then used to scale or calculate the emission output, otherwise known as the "effective" emission of the vehicle at the time of travel. The tracking component provides knowledge of adherence to the prescribed route or routes and can then be utilized by the driver or regulatory agency for route tracking purposes. The recommender, as mentioned above, consists of an input data collecting component providing a source starting point and destination point along with departure time and a list of vehicles and vehicle properties as well as emission impact parameters such as, but not limited to, weather conditions, demographics (areas with schools, parks, or residential areas versus wide open, sparsely populated land). The output component provides at least one travel route that minimizes the effective emission during the trip while satisfying the parameters of user constraints with a penalty and/or cost associated with every suggested route. User constraints may include, among other things, maximum travel time or maximum distance that the user is willing to travel. The tracker utilizes information regarding actual start and end of travel and checks to determine if the vehicle adhered to any of the recommended routes, along with its cost or violation of not doing so.

For ease of understanding, an examplary method of determining recommended vehicular travel route will be used. However, as can be understood by one skilled in the art, the use of embodiments as described herein can be used in other applications and systems.

In accordance with at least one embodiment of the invention, there are broadly contemplated herein methods and arrangements, inter alfa, for suggesting travel routes with minimum effective emissions from individual vehicles by considering the overall impact of the vehicle emissions and not just the absolute value of these emissions. Adaptability of the driver's requests to travel routes is considered as well as predictability of future environmental conditions during the specified travel times and considered in the calculations. Multiple recommendations can be given. Information for travel route determination can be collected from various sources of input. Each travel route will consist of a start parameter and an end parameter along with travel time that correlates to each specified environmental factor in terms of the specified indices for each variable environmental factor. Consideration of the impact of a fixed amount of emission varies depending on multiple factors, therefore, determination of weather and air quality components as well as demographic information or population density conditions in smaller regions or zones can be useful in scaling the total emission as effective emission. In other words, calculating total effective emission for a route gives a better understanding of its emission impact in a more concise manner. The impact of an emitted pollutant, such as carbon monoxide from vehicles, varies depending on several factors. Overcast skies can trap certain gases and not allow them to dissipate upwards away from the population. This condition facilitates poorer air quality, whereas rainfall settles pollutants, reducing them from the air and improving air quality. Similarly, air pollutants will have a greater harmful impact on more populated areas such as schools, hospitals and residential areas compared to areas having less population density such as national highways and forests where the harmful impact will be less. All of these areas can include time-specific risk zones wherein the time-specific risk zone refers to a zone where a health risk due to emission factors can be associated with a given time of travel. In other words, during certain travel times, pollutants will be more harmful.

By way of further example, the route tracking system monitors the activities of the vehicle and determines the adherence to the recommended route and calculates overall travel costs, including the costs associated with the emission parameters; it also reports violations. Solutions toward this end, and others, will now be appreciated from the ensuing discussion. The features discussed above, and others, relating to at least one embodiment of the invention, will be better appreciated from the discussion which follows.

Figure 1:
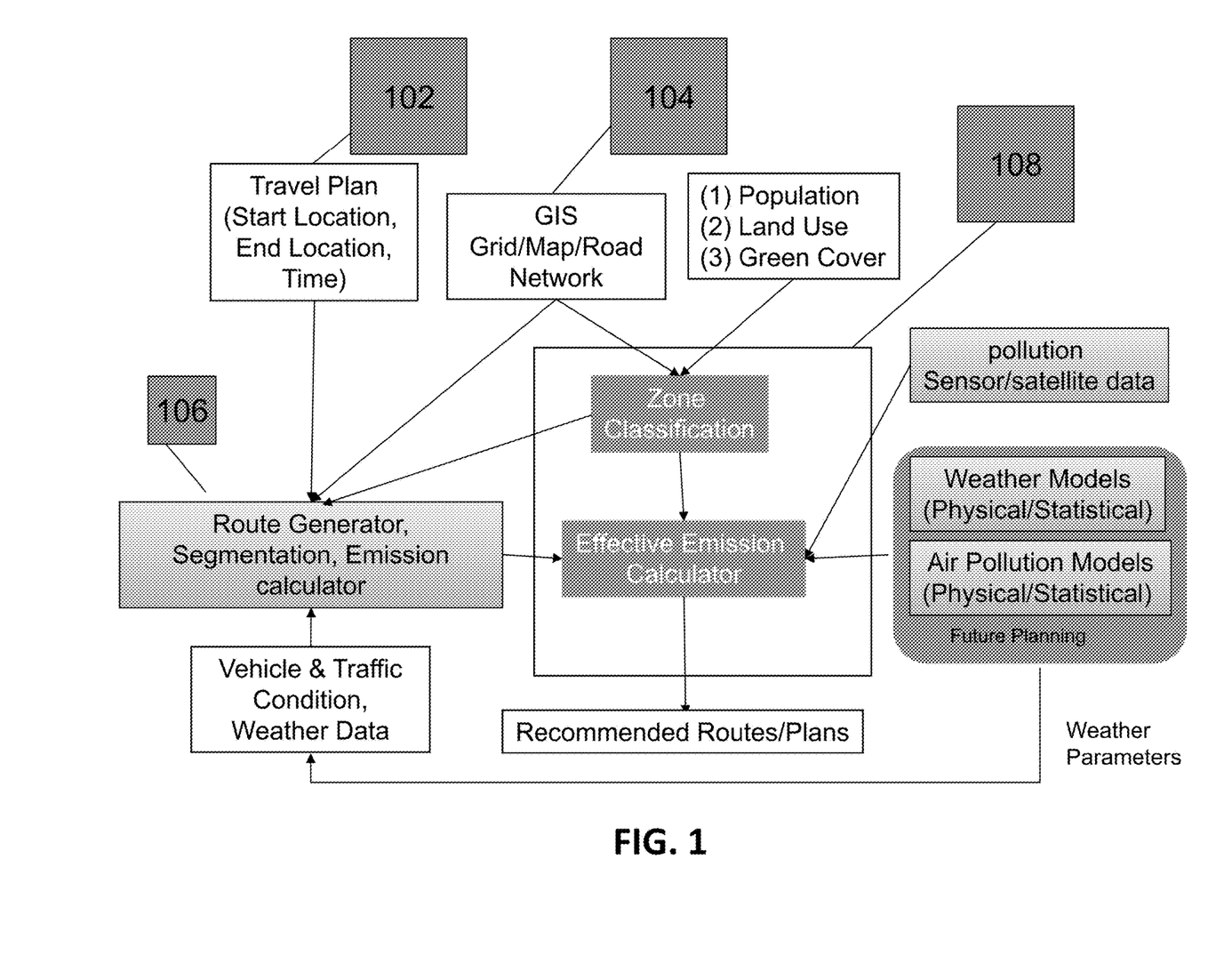
FIG. 1 schematically illustrates a system architecture recommending vehicular travel route(s) based on calculating effective emissions using plurality of travel routes, environmental data and GIS (geographic information system) information.

In accordance with a general background relative to at least one embodiment of the invention, FIG. 1 schematically illustrates a general concept of calculating effective emission for a route and thereby recommending routes with low effective emissions. By way of example, a user requests a travel plan (102) requiring starting and ending locations, as well as the time of day during which the travel plan will be executed. A GIS (geographical information system) network (104) or other methods of input provides information regarding the travel route in terms of a grid, map, or road. A route generator (106) identifies and segments the routes between start and end locations using roadmap (a set of travel routes) and zone map (obtained from zone classification system wherein the zones are described as segments utilizing an environmental zone classification). An emission calculator (106) is employed to compute absolute emission from a vehicle using vehicle properties along with road, traffic and weather conditions. The emission calculator in component (106) is used to compute the absolute vehicle admission. The zone classification (108) utilizes environmental parameters such as, but not limited to, population, land use, and green cover for creating the zone map. The effective emission calculator adjusts the absolute emission based on zone and ambient air quality information. The data used in the effective emission calculation can be provided by any type of sensor or satellite and the calculations using these data indicate the vehicular emission cost to the environment as well as the human population. Weather and air quality model parameters can be established by physical or statistical data that are either historical or futuristic or a combination of both. Adherence of the vehicle to the preferred route that has been recommended after calculation is known as vehicular adherence. The adherence can be used to determine how well the driver follows the recommended route without penalty.

The cost computation function as it relates to the effective emission cost calculation, by way of example, consists of a cost function calculation for each segmental zone (Cz) as well as a cost function calculation for the ambient air quality index (Caq). The calculations as indicated determine the risk designation, or cost factor, considered in the effective emission cost for each individually recommended travel route. The cost function for zones is calculated in the following manner: $Cz(i)=i+a(Pz(i)+b(Rz(i))+(1-a-b)$ $(1-Gz(i))$ wherein i=zone number, Pz=population fraction which equals the average population density of a zone divided by the max(average population density across the entirety of zones crossed in travel). Rz equals the high risk fraction, e.g., hospital, school, or park, wherein the percentage of high risk people in a zone is divided by the maximum percentage of risk averse people across the entirety of zones traveled. Gz equals the fraction of green cover, and a and b are the weights for different factors (0<a, b<1). The green cover, Gz, for a zone is calculated from land-use data by considering the areas marked as forests/parks; if there are m cells in the zone and p of them are marked as comprised of parks/forests in the land-use data, then the Green cover, Gz, is taken to be the fraction p/m. The cost function of ambient air quality (Caq) is calculated as: $Caq(i)=i\times[1+Faq(i)]$, wherein i is equal to the Air Quality Index (AQI) value and Faq is equal to the fraction of affected people for an AQI. The AQI relates to the pollution level wherein zone 1 would equate to the lowest level of pollution and subsequent zones would indicate higher levels of pollution.

Figure 2:
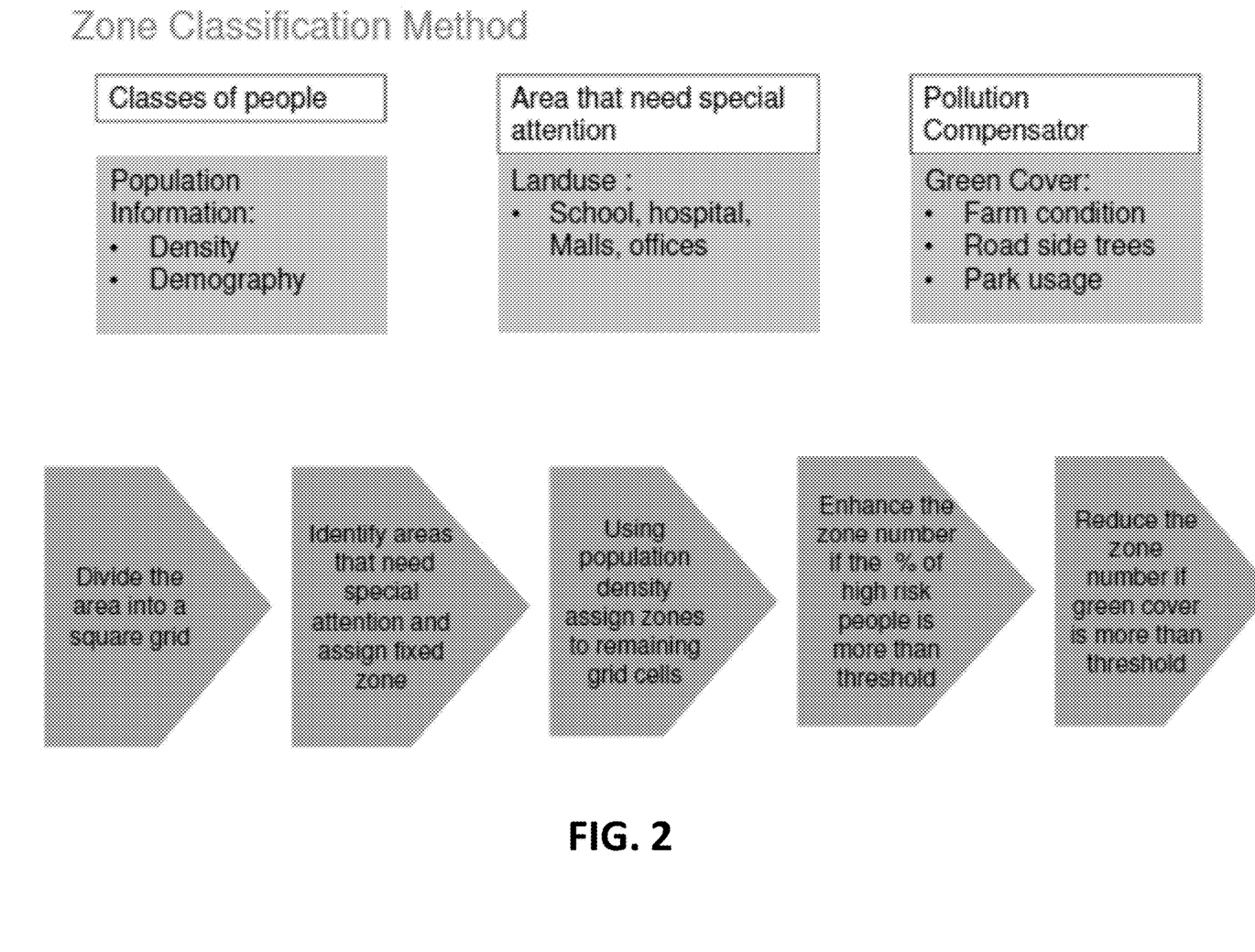
FIG. 2 schematically illustrates a zone classification system.

In accordance with at least one embodiment of the invention, an example of zone classification determination as it relates to the calculation of effective emission, is depicted in FIG. 2. Here, in a travel scenario, a zone classification method is employed including population density, land use, as well as a pollution compensator, or green cover component. The travel area is divided into a square grid and the information is then combined with identifying areas that need special attention and fixed (highest) zone numbers are then assigned based on these identified areas. A higher zone number indicates higher impact and risk due to pollution. In view of population density, zone numbers are assigned to any remaining grid cells. The zone number can be adjusted based on the percentage of high risk population in the area for example, children, elderly, and people with asthma. Enhancement of each zone number occurs if the percentage of a high risk population is greater than a predetermined threshold. A reduction of the zone number is considered if the green cover is more than the threshold. The zone classification creates a time-specific zone map as the assignment of a zone number to an area varies with the time of the day depending upon its population information, for example, school is treated as a special attention zone area only during school hours and not otherwise. A preferred travel route is determined based on the above assignment of zones with lowest possible risk to the environment and/or the human population at each specific time indicated for travel.

Figure 3:
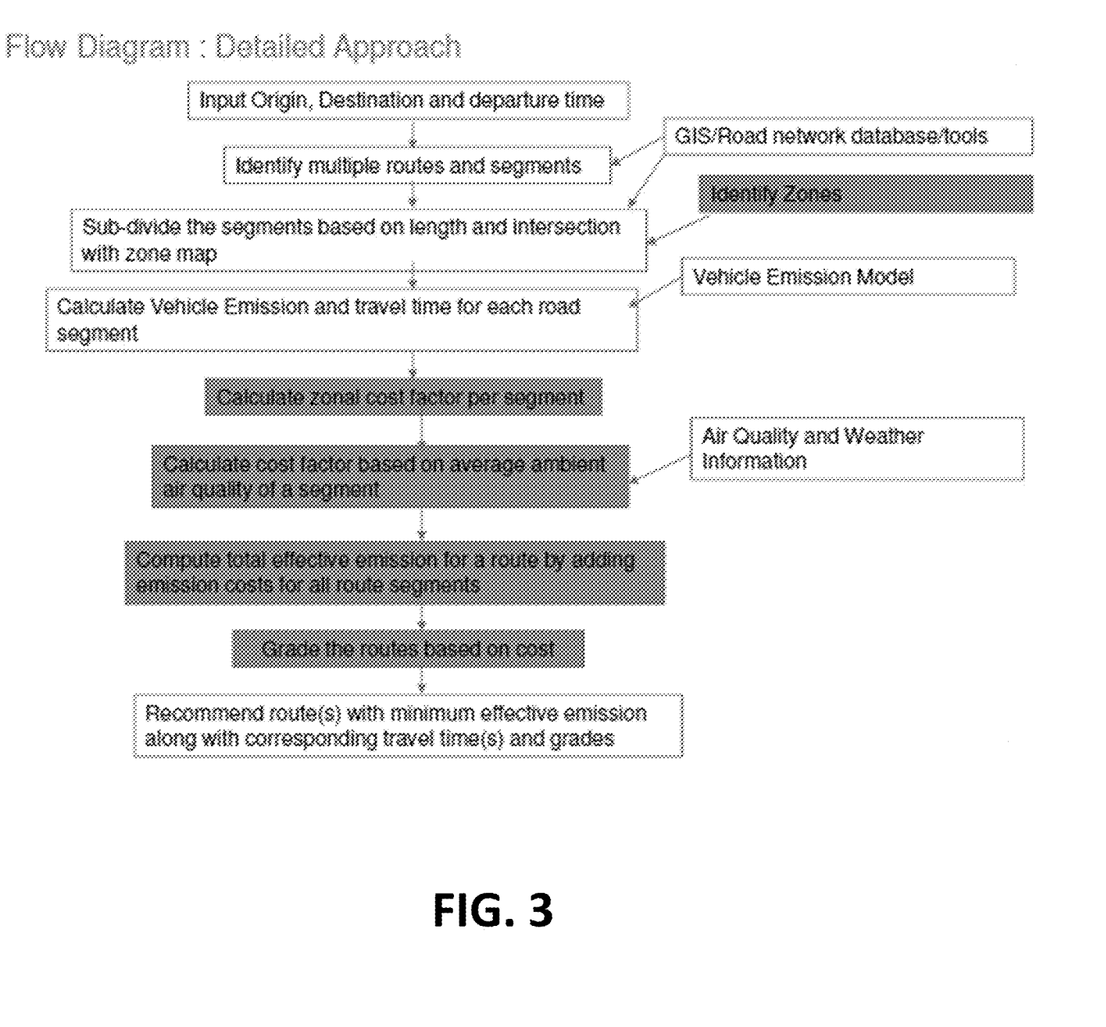
FIG. 3 schematically illustrates a detailed approach for recommending travel route.

FIG. 3 schematically illustrates for purposes of example, a detailed approach in a flow diagram format for determination of a travel route. The travel route begins with the input data regarding the vehicular route. Multiple routes and segments of the route are identified and zones of the travel route are identified. The segments are sub-divided from the length of the entire trip and these segments are based on length and intersections with the zone map. The vehicle emission and travel time are calculated for each sub-divided road segment. A zonal emission cost factor for each segment is calculated based on the zone it belongs to, which is determined using environmental parameters at the time of travel such as, but not limited to, population density, land use, and green cover factors. Another emission cost factor is also calculated for each segment based on its average ambient air quality that is obtained by averaging the available air quality information of its surrounding area. The effective emission cost for each segment is then calculated by adjusting the absolute vehicle emission on this segment using zonal and air quality cost factors. The aggregate effective emission cost is calculated for different combinations or segment arrangements of the travel routes by adding the emission costs for all route segments. A set of recommended routes is determined based on their effective emission costs and their corresponding travel time is also reported. The recommended routes are also graded, which determines the order of recommended routes. For example, if the effective emission cost for a recommended route is less than 110% of the emission cost of the optimal route (having lowest cost) then this route is given the highest grade, and if its emission cost is less than 125% of the lowest emission cost then it is given second highest grade and so on.

Figure 4:
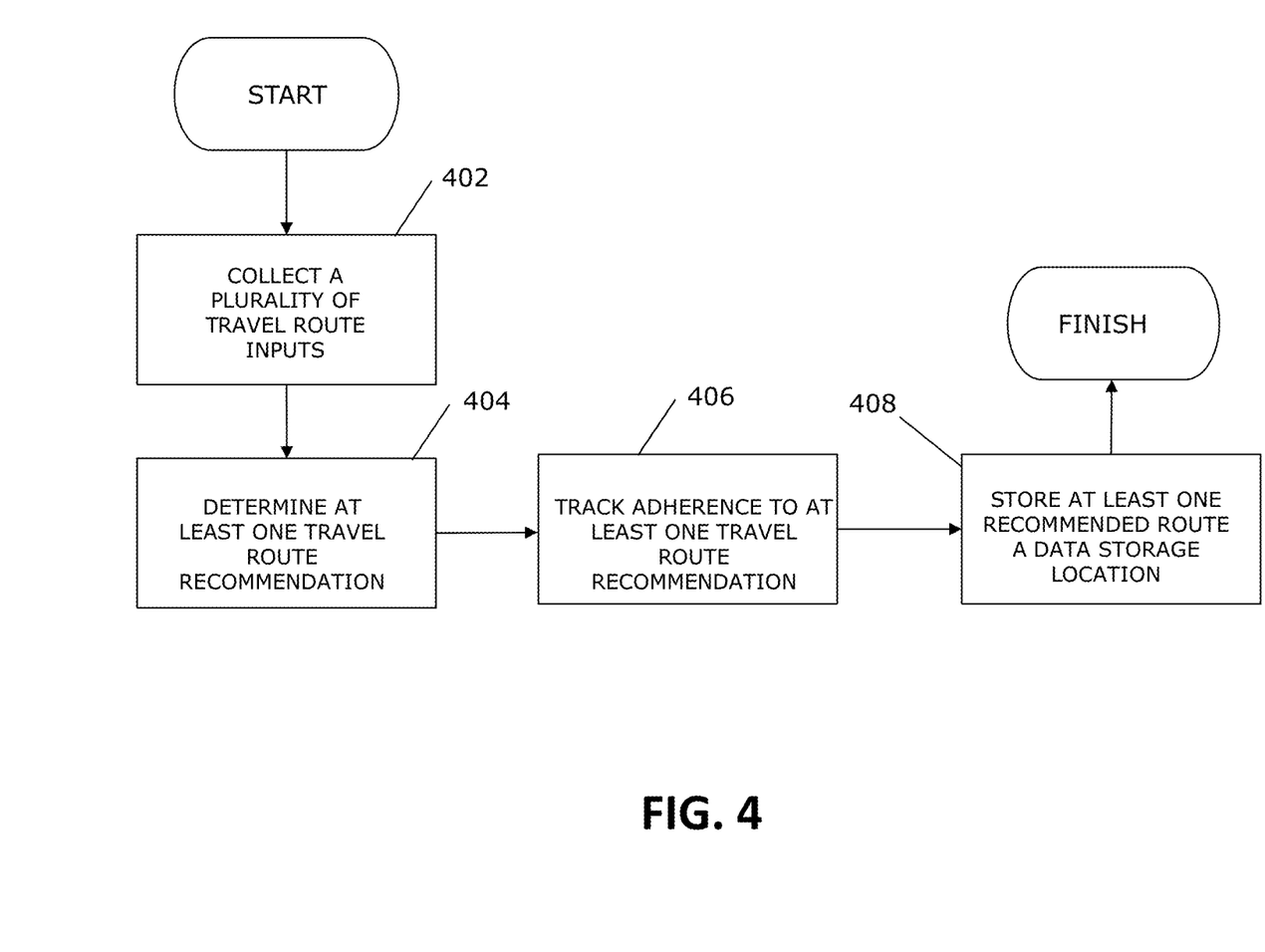
FIG. 4 sets forth a process more generally for determining and tracking vehicular travel route.

As such, there are broadly contemplated herein, in accordance with at least one embodiment of the invention, methods and arrangements for determining a recommended vehicular travel route. At a very general level, FIG. 4 provides an overview of the main steps in a procedure broadly contemplated herein.

It can be appreciated from the foregoing that, in accordance with at least one embodiment of the invention, a technical improvement is disclosed, represented at least via methods and arrangements for effective emission calculation, in which travel routes with minimum effective emissions from a vehicle are suggested by considering the overall environmental emission impact and not just the absolute value of the vehicle emission component. This system can be used to predict future recommended travel as well as re-route current recommended routes based on real-time travel constraints. A method of tracking adherence and reporting violation is also contemplated herein.

The re-calculation of preferred routes can be considered during travel if the start time of the trip deviates from when the recommended routes were generated or if the operator of the vehicle encounters extraneous factors other than the factors initially predicted during route calculation, thereby adding new route options that are more cost effective than previously presented as options for travel. A route matcher can be employed to monitor the actual route taken, as well as to monitor deviations from the original routing due to the above mentioned factors. The report generated from the route matcher will include the closest matched recommended route along with its associated grade or a violation in case of no match with any of the recommended routes.

In accordance with at least one embodiment of the invention, very generally, quantitative values as determined herein, or other data or information as used or created herein, can be stored in memory or displayed to a user on a screen, as might fit the needs of one or more users.

Figure 5:
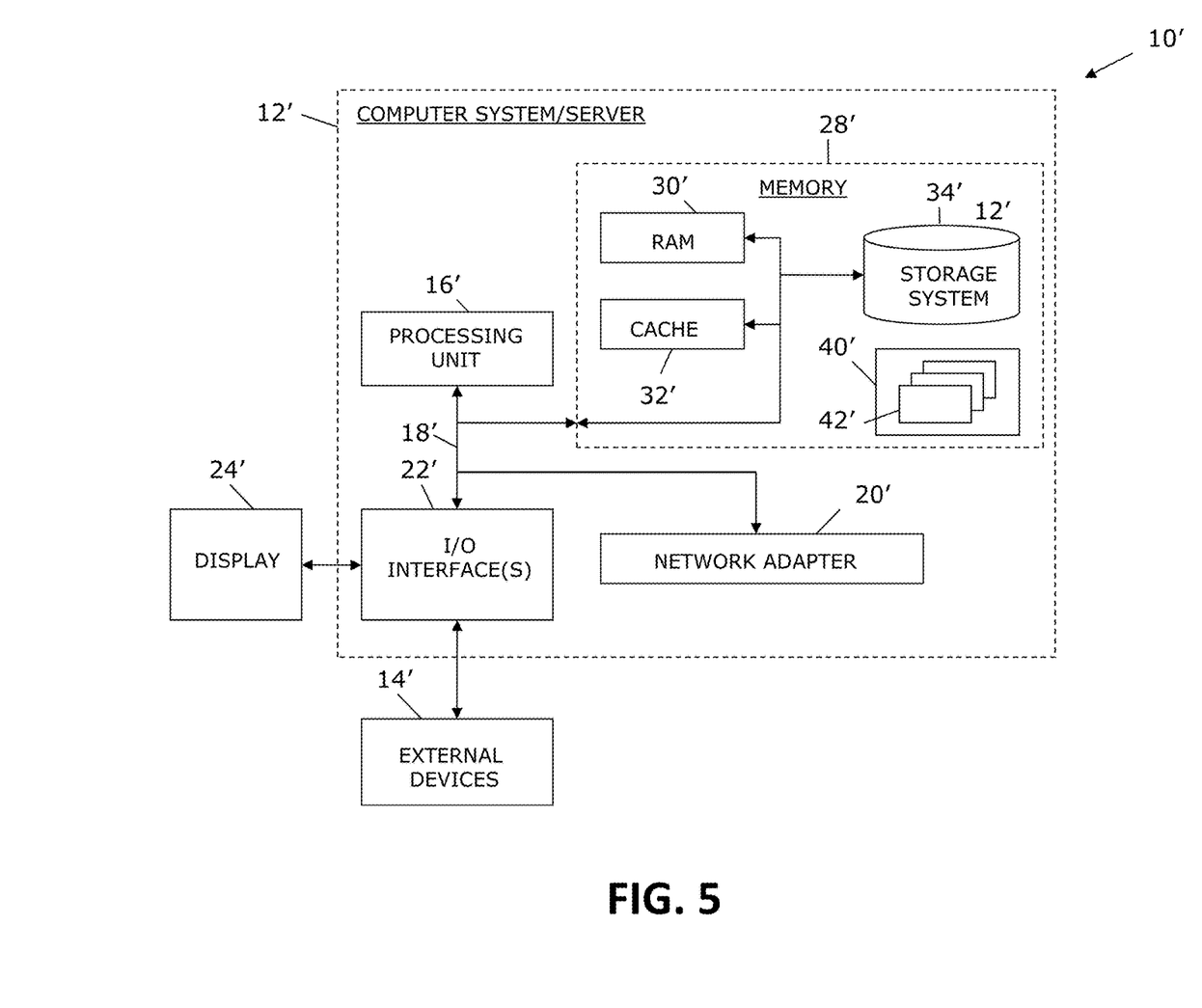
FIG. 5 illustrates a computer system.

It should be appreciated that a process, such as that broadly illustrated in FIG. 4, can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units and system memory such as those indicated, respectively, at 16' and 28' in FIG. 5.

As shown in FIG. 4, in accordance with at least one embodiment of the invention, a plurality of travel route inputs are collected (402). A determination of at least one route is recommended (404). There are tracked at least one route (406).

Referring now to FIG. 5, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining at least one recommended vehicular travel route, said method comprising:
   utilizing at least one processor to execute computer code that performs the steps of:
   collecting a plurality of travel route inputs from a plurality of sources relative to a travel route comprising a starting point and an ending point;
   determining a lowest effective emissions travel route, from a plurality of possible travel routes, between the starting point and the ending point, wherein the determining the lowest effective emissions comprises comparing effective emissions identifying an overall impact of emissions of a vehicle against absolute emissions, the effective emissions and absolute emissions being calculated for each of the plurality of possible travel routes, wherein the absolute emissions is calculated using a emissions calculator comprising the use of vehicle properties, road properties, traffic properties, and weather conditions, wherein the determining comprises:
   (i) identifying population density conditions in each zone along each of the plurality of possible travel routes;
   (ii) identifying a percentage of high risk individuals in each zone along each of the plurality of possible travel routes;
   (iii) identifying weather conditions for each zone along each of the plurality of possible travel routes;
   (iv) assigning an absolute emissions output value for each of (i), (ii), and (iii), wherein a lower absolute emissions output value corresponds to: a lower population density condition, a lower percentage of the high risk individuals, and clear weather conditions;
   (v) calculating an effective emissions output value by aggregating the absolute emissions output value for each of (i), (ii), and (iii) and adjusting the aggregated absolute emissions output value based on zone and ambient air quality information; and
   (vi) determining the lowest effective emissions travel route by identifying a travel route from the plurality of possible travel routes having a lowest effective emissions output value;
   providing, to a user, a recommendation comprising the lowest effective emissions travel route; and
   tracking vehicle adherence to the recommendation.

2. The method according to claim 1, wherein said collecting comprises collecting a plurality of travel route inputs for calculating vehicular emission costs.

3. The method according to claim 1, wherein said assessing comprises identifying, based upon predetermined criteria, at least one time-specific risk zone.

4. The method according to claim 3, wherein the at least one time-specific risk zone comprises at least one zone in the travel route selected from the group consisting of: a zone of higher population density, a zone defined by one or more aspects of land use, and a zone including green cover.

5. The method according to claim 3, wherein said assessing comprises assigning an effective emission output value, based on predetermined risk designations.

6. The method according to claim 5, wherein said assigning comprises calculating an emission cost factor for each time-specific risk zone.

7. The method according to claim 5, wherein said assigning comprises calculating an average ambient air quality index for each time-specific risk zone.

8. The method according to claim 5, wherein said assigning comprises assessing population density for each time specific risk zone.

9. The method according to claim 1, wherein said assigning comprises:
   identifying risk zones;
   measuring ambient air quality of the risk zones; and
   calculating the predetermined risk designation.

10. The method according to claim 1, wherein:
    the travel route comprises a plurality of segments; and
    said determining comprises assessing the collected plurality of travel route inputs and taking into consideration vehicle emission impact parameters relative to each of the segments.

11. The method according to claim 10, wherein said assessing comprises recommending at least one travel route based on a user-specified request during completion of at least one of the route segments.

12. The method according to claim 1, wherein said assessing comprises grading emission categories based on effective emission costs.

13. The method according to claim 1, wherein said tracking comprises utilizing a route matcher.

14. An apparatus for determining at least one recommended vehicular travel route, said apparatus comprising:
    at least one processor; and
    a computer readable storage medium having computer readable program code embodied therewith and executable by the at least one processor, the computer readable program code comprising:
    computer readable program code configured to collect a plurality of travel route inputs from a plurality of sources relative to a travel route comprising a starting point and an ending point;
    computer readable program code configured to determine a lowest effective emissions travel route, from a plurality of possible travel routes, between the starting point and the ending point, wherein the determining the lowest effective emissions comprises comparing effective emissions identifying an overall impact of emissions of a vehicle against absolute emissions, the effective emissions and absolute emissions being calculated for each of the plurality of possible travel routes, wherein the absolute emissions is calculated using a emissions calculator comprising the use of vehicle properties, road properties, traffic properties, and weather conditions, wherein the determining comprises:
(i) identifying population density conditions in each zone along each of the plurality of possible travel routes;
(ii) identifying a percentage of high risk individuals in each zone along each of the plurality of possible travel routes;
(iii) identifying weather conditions for each zone along each of the plurality of possible travel routes;
(iv) assigning an absolute emissions output value for each of (i), (ii), and (iii), wherein a lower absolute emissions output value corresponds to: a lower population density condition, a lower percentage of the high risk individuals, and clear weather conditions;
(v) calculating an effective emissions output value by aggregating the emissions output value for each of (i), (ii), and (iii) and adjusting the aggregated absolute emissions output value based on zone and ambient air quality information; and
(vi) determining the lowest effective emissions travel route by identifying a travel route from the plurality of possible travel routes having a lowest effective emissions output value;
computer readable program code that provides, to a user, a recommendation comprising the lowest effective emissions travel route; and
computer readable program code configured to track vehicle adherence to the recommendation.

15. A computer program product for determining at least one recommended vehicular travel route, said computer program product comprising:
at least one processor; and
a computer readable storage medium having computer readable program code embodied therewith and executable by the at least one processor, the computer readable program code comprising:
computer readable program code configured to collect a plurality of travel route inputs from a plurality of sources relative to a travel route comprising a starting point and an ending point;
computer readable program code configured to determine a lowest effective emissions travel route, from a plurality of possible travel routes, between the starting point and the ending point, wherein the determining the lowest effective emissions comprises comparing effective emissions identifying an overall impact of emissions of a vehicle against absolute emissions, the effective emissions and absolute emissions being calculated for each of the plurality of possible travel routes, wherein the absolute emissions is calculated using a emissions calculator comprising the use of vehicle properties, road properties, traffic properties, and weather conditions, wherein the determining comprises:
(i) identifying population density conditions in each zone along each of the plurality of possible travel routes;
(ii) identifying a percentage of high risk individuals in each zone along each of the plurality of possible travel routes;
(iii) identifying weather conditions for each zone along each of the plurality of possible travel routes;
(iv) assigning an absolute emissions output value for each of (i), (ii), and (iii), wherein a lower absolute emissions output value corresponds to: a lower population density condition, a lower percentage of the high risk individuals, and clear weather conditions;
(v) calculating an effective emissions output value by aggregating the emissions output value for each of (i), (ii), and (iii) and adjusting the aggregated absolute emissions output value based on zone and ambient air quality information; and
(vi) determining the lowest effective emissions travel route by identifying a travel route from the plurality of possible travel routes having a lowest effective emissions output value;
computer readable program code that provides, to a user, a recommendation comprising the lowest effective emissions travel route; and
computer readable program code configured to track vehicle adherence to the recommendation.

16. The computer program product according to claim 15, wherein the collecting comprises collecting a plurality of travel route inputs for calculating vehicular emission costs.

17. The computer program product according to claim 15, wherein the assessing comprises identifying, based upon predetermined criteria, at least one time-specific risk zone.

18. The computer program product according to claim 17, wherein the at least one time-specific risk zone in the travel route selected from the group consisting of: a zone of higher population density, a zone defined by one or more aspects of land use, and zone including green cover.

19. The computer program product according to claim 15, wherein the assessing comprises assigning an effective emission output value, based on predetermined risk designations.

* * * * *